United States Patent
Bi

(10) Patent No.: US 9,952,764 B2
(45) Date of Patent: Apr. 24, 2018

(54) APPARATUS AND METHOD FOR TOUCHSCREEN KEYBOARD SUGGESTION WORD GENERATION AND DISPLAY

(71) Applicant: Google Inc., Mountain View, CA (US)

(72) Inventor: Xiaojun Bi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 327 days.

(21) Appl. No.: 14/831,589

(22) Filed: Aug. 20, 2015

(65) Prior Publication Data

US 2017/0052703 A1     Feb. 23, 2017

(51) Int. Cl.
| | |
|---|---|
| G06F 3/048 | (2013.01) |
| G06F 3/041 | (2006.01) |
| G06F 3/0489 | (2013.01) |
| G06F 3/0488 | (2013.01) |
| G06F 3/0482 | (2013.01) |
| G06F 17/27 | (2006.01) |

(52) U.S. Cl.
CPC ........ G06F 3/04897 (2013.01); G06F 3/0482 (2013.01); G06F 3/04886 (2013.01); G06F 17/276 (2013.01)

(58) Field of Classification Search
CPC ........ G06F 3/048; G06F 17/24; G06F 17/276
See application file for complete search history.

(56) References Cited

U.S. PATENT DOCUMENTS 5,673,429 A * 9/1997 Minatogawa ....... G06F 3/04895
6,002,390 A    12/1999 Masui 9,134,810 B2   9/2015 Griffin et al.
2003/0014239 A1  1/2003 Ichbiah et al.
(Continued)

FOREIGN PATENT DOCUMENTS

EP    2592568 A1   5/2013
EP    2618239 A1   7/2013
(Continued)

OTHER PUBLICATIONS

Prosecution History from U.S. Appl. No. 14/102,161, dated Mar. 14, 2014 through Jun. 5, 2015, 112 pp.
(Continued)

*Primary Examiner* — Jennifer To
*Assistant Examiner* — Jasmine Wan
(74) *Attorney, Agent, or Firm* — Shumaker & Sieffert, P.A.

(57) ABSTRACT

A method and apparatus, such as an electronic device (104), for displaying suggestion words in response to a touch input to a presence-sensitive display (106). The presence-sensitive display (106) displays a touchscreen keyboard (110) having a plurality of key areas (112) each associated with a character (114). The method and apparatus may determine (308) the character (114) of the touchscreen keyboard based on a touch location of the touch input on a key area (112) of the touchscreen keyboard (110), and may display (310) a plurality of suggestion words that include the determined character over at least a portion of the touchscreen keyboard during the touch input. When the touch input has ended, the method and apparatus may stop displaying the plurality of suggestion words. The method and apparatus may also display a plurality of suggestion words in a text view area separate from the touchscreen keyboard.

17 Claims, 8 Drawing Sheets

(56) References Cited

U.S. PATENT DOCUMENTS

| | | | |
|---|---|---|---|
| 2004/0225956 A1* | 11/2004 | Beezer | G06F 17/218 715/205 |
| 2005/0246663 A1* | 11/2005 | Yeung | G06F 17/30067 715/851 |
| 2006/0265648 A1* | 11/2006 | Rainisto | G06F 3/0237 715/259 |
| 2007/0046641 A1 | 3/2007 | Lim | |
| 2007/0074131 A1* | 3/2007 | Assadollahi | G06F 3/0237 715/816 |
| 2008/0284741 A1* | 11/2008 | Hsu | G06F 3/0485 345/173 |
| 2009/0058823 A1 | 3/2009 | Kocienda | |
| 2009/0313574 A1* | 12/2009 | Shih | G06F 3/0483 715/781 |
| 2010/0085313 A1 | 4/2010 | Rider | |
| 2010/0225599 A1 | 9/2010 | Danielsson et al. | |
| 2010/0257480 A1* | 10/2010 | Kurose | G06F 17/211 715/784 |
| 2011/0099506 A1 | 4/2011 | Gargi et al. | |
| 2011/0302518 A1 | 12/2011 | Zhang | |
| 2012/0030606 A1 | 2/2012 | Zhang | |
| 2012/0113008 A1* | 5/2012 | Makinen | G06F 3/016 345/168 |
| 2012/0149477 A1* | 6/2012 | Park | G06F 3/0202 463/43 |
| 2012/0326984 A1 | 12/2012 | Ghassabian | |
| 2013/0019169 A1* | 1/2013 | Bastide | G06F 17/273 715/257 |
| 2013/0120266 A1 | 5/2013 | Griffin et al. | |
| 2013/0125034 A1* | 5/2013 | Griffin | G06F 3/04886 715/773 |
| 2013/0187857 A1 | 7/2013 | Griffin et al. | |
| 2013/0285913 A1 | 10/2013 | Griffin et al. | |
| 2013/0285916 A1 | 10/2013 | Griffin et al. | |
| 2014/0062875 A1* | 3/2014 | Rafey | G06F 17/276 345/158 |
| 2015/0040055 A1 | 2/2015 | Zhao et al. | |
| 2015/0091805 A1* | 4/2015 | Mahajan | G06F 3/021 345/168 |
| 2015/0160855 A1 | 6/2015 | Bi | |

FOREIGN PATENT DOCUMENTS

| | | |
|---|---|---|
| WO | 2010099835 A1 | 9/2010 |
| WO | 2012076743 A1 | 6/2012 |
| WO | 2013119712 A1 | 8/2013 |

OTHER PUBLICATIONS

U.S. Appl. No. 15/157,229, by Xiaojun Bi, filed May 17, 2016.
Nosowitz, "BlackBerry Z1 0 Review: If They Could Turn Back Time . . . " Popular Science [online]. Mar. 21, 2013. retrieved from the Internet: <http://www.popsci.com/gadgets/article/2013-03/blackberry-z10-review> 10 pgs.

* cited by examiner

APPARATUS AND METHOD FOR TOUCHSCREEN KEYBOARD SUGGESTION WORD GENERATION AND DISPLAY

TECHNICAL FIELD

The present disclosure relates generally to suggestion word methodologies for electronic devices and, more specifically, to suggestion word generation and display methods of suggestion words.

BACKGROUND

Certain electronic devices, such as computers, tablets, smart phones, cellular phones, personal digital assistants, and the like include touchscreens that include a touchscreen keyboard (e.g., a graphical keyboard or a virtual keyboard) that allow a user to input (e.g., enter) characters into, for example, an application. A touchscreen keyboard usually includes virtual-key areas where various characters are displayed. The touchscreens may also include a text view area to display the inputted (e.g., entered) characters. Various touchscreen keyboards allow a user to input a character by touching (e.g., with a user's finger or a stylus) an area (e.g., virtual key) of the touchscreen keyboard associated with the particular character and display that character in the text view area of the touchscreen. For example, presence-sensitive displays allow users to tap on virtual-key areas of a graphical keyboard that are associated with specific characters. When a user touches a key area associated with a particular character, the character displays in the text view area of the presence-sensitive display. In addition, some electronic devices provide a suggestion word such that as a user inputs a character into the touchscreen keyboard the electronic device displays the suggested word. The user may then select the suggested word as a shortcut to inputting the remaining characters for that word. For example, if a user inputs the characters 'e' and 'n,' the word "enter" may display as a suggested word. In this instance, if the user intends to enter that word, the user may select the word instead of entering the remaining characters of 't,' 'e,' and 'r.' Touchscreen keyboards may support "tap typing," whereby a user enters characters by touching and releasing a virtual-key area on the touchscreen keyboard. Touchscreen keyboards may also support "gesture typing," whereby a user enters characters via swiping gesture motions. For example, a user may touch one area of the touchscreen keyboard associated with one character, and without releasing the touch, swipe to another area of the touchscreen keyboard associated with another character. If the user releases the touch, both characters are selected and entered in the order they were selected.

In some solutions, a dedicated suggested word area of the touchscreen (e.g., a suggestion bar) displays the suggestion word. One drawback with this approach is that the suggested word area of the touchscreen always occupies touchscreen display area that could otherwise be used for other purposes, such as allowing for a larger size of the text view area. Another drawback is that the dedicated suggested word area of the touchscreen may distract users. For example, a user may need to adjust his focus from the keyboard area, as the user inputs characters, to the dedicated suggested word area to select a suggested word. Other solutions provide a single suggestion word displayed near a swiping finger as a user performs a swiping gesture on the touchscreen keyboard. One drawback with this approach is that it allows for the display of only one suggested word, decreasing the probability that the word that the user intends to enter will be displayed. Other solutions provide multiple suggestion words, but only with the use of gesture typing. Moreover, the suggested words are displayed near probable next letters. This solution forces users to enter characters with swiping motions if they want to see suggested words. In addition, because the suggested words are displayed near probable next letters, users have to scan the touchscreen keyboard area to search for the suggested words. Thus, there are opportunities for improved systems and methods for suggestion word generation and display on touchscreen keyboards.

BRIEF DESCRIPTION OF THE DRAWINGS

The disclosure will be more readily understood in view of the following description when accompanied by the below figures and wherein like reference numerals represent like elements, wherein.

DETAILED DESCRIPTION

Figure 1:
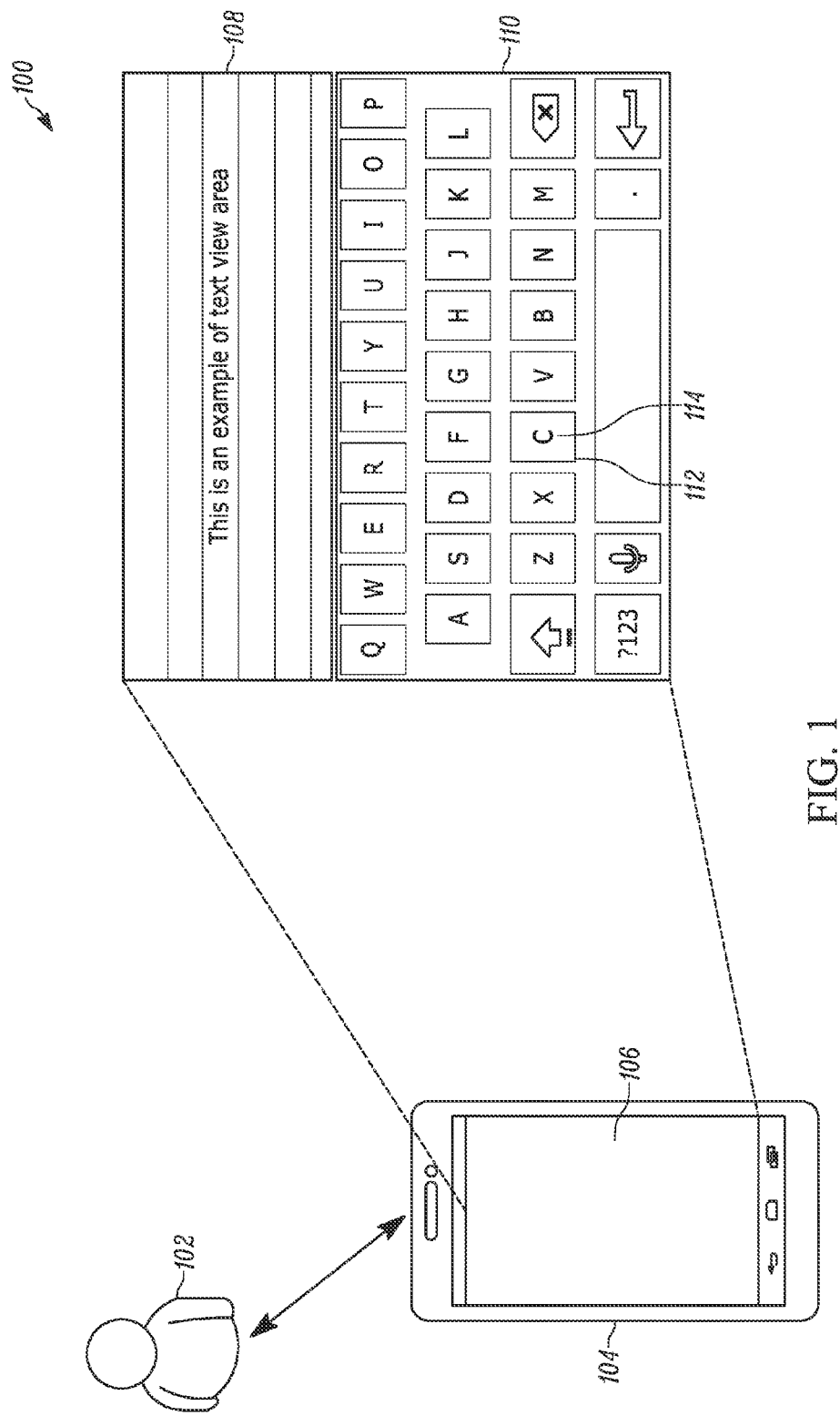
FIG. 1 illustrates a diagram of one example of an electronic device that includes a presence-sensitive display displaying a touchscreen keyboard having a plurality of virtual-key areas for inputting characters and a text view area for viewing inputted characters.

Briefly, the present disclosure relates to methods and apparatus that, based on touchscreen keyboard inputs, generate and control placement of suggestion words for display. By displaying multiple suggestion words over at least a portion of a touchscreen keyboard, presence-sensitive display area that otherwise would have been used to display the suggestion words may now be used for other purposes, such as allowing for a larger text view area of the presence-sensitive display. Moreover, in some embodiments, by placing suggestion words near a location that the user is currently viewing, the user can more easily view, evaluate, and select a suggested word. Suggestion words may be positioned in a horizontal, vertical, or radial list near the location of a touch input, near the space bar of a virtual keyboard, or in a text view area.

In one embodiment, a method and apparatus display a touchscreen keyboard having a plurality of virtual-key areas. For example, an electronic device may include a presence-sensitive display that displays the touchscreen keyboard. The method and apparatus may determine a character of the touchscreen keyboard based on a touch location of a touch input (e.g., a current tap-down location) on a virtual-key area of the touchscreen keyboard, and may display a plurality of suggestion words that include the determined character over at least a portion of the touchscreen keyboard during the touch input. The suggestion words may be displayed, for example, as a floating preview of suggestion words over the touchscreen keyboard during the touch input. A touch input on a touchscreen keyboard may be, for example, a finger touch, a touch by an input device such as a stylus, or any other suitable input mechanism allowing input into the touchscreen keyboard. When the touch input has ended (e.g., the user has released the touch), the method and apparatus may stop displaying the plurality of suggestion words. For example, the method and apparatus may determine the character 'G' based on a user touching the virtual-key area associated with the character 'G' on a touchscreen keyboard. As the user touches the virtual-key area associated with the character 'G,' the method and apparatus may display suggestion words starting with the character 'G' over a portion of the touchscreen keyboard. When the user releases the touch, the method and apparatus may stop displaying the suggestion words (e.g., they disappear). In one embodiment, the suggestion words may be displayed over a portion of the touchscreen keyboard just above the virtual-key area associated with the determined character.

In one embodiment, the method and apparatus determine a current time duration of the touch input, and they display the plurality of suggestion words when the current time duration of the touch input is beyond (e.g., over) a threshold time duration. For example, the method and apparatus may display the plurality of suggestion words when the duration of the touch input is about 600 milliseconds. In one example, the method and apparatus allow a user to set a threshold duration such that the plurality of suggestion words are displayed when the duration of the touch input is greater than or equal to the threshold duration. In one embodiment, the method and apparatus may stop displaying the plurality of suggestion words when the current time duration of the touch input is beyond yet a second threshold time duration. For example, while the method and apparatus may begin displaying the plurality of suggestion words when the duration of the touch input is beyond a first threshold of time, the method and apparatus may stop displaying the plurality of suggestion words after a duration of the touch input greater than a second threshold of time, where the second threshold of time is greater than the first threshold of time. For example, in continuing the example from earlier where the method and apparatus display the plurality of suggestion words when the duration of the touch input is at least 2 seconds, the method and apparatus may stop displaying the plurality of suggestion words after the duration of the touch input is over 20 seconds.

In one embodiment, the method and apparatus determine a second character based on a second touch location of a second touch input on the touchscreen keyboard, and they display a second plurality of suggestion words that include the first character and the second character over at least a portion of the touchscreen keyboard during the second touch input. For example, in continuing with the above example, after the user touches the key area associated with the character 'G' (e.g., after the duration of the first touch input), the user may release the touch associated with character 'G' and touch a key area associated with the character 'O.' As the user touches the key area associated with the character 'O,' the method and apparatus may stop displaying the original suggestion words that began with the character 'G,' and begin displaying a plurality suggestion words starting with the characters 'GO' over a portion of the touchscreen keyboard. In some embodiments, suggestion words displayed include inputted characters up to the character associated with a key area currently being touched (e.g., current touch location), and are displayed near the virtual-key area currently being touched.

In one embodiment, the method and apparatus receive an indication of a second touch input at a second touch location associated with a spacebar key area on the touchscreen keyboard, and they re-display the plurality of suggestion words over at least a portion of the spacebar key area during the second touch input. For example, in continuing the prior example, as the user touches the key area associated with the character 'G,' the method and apparatus may display suggestion words starting with the character 'G' over a portion of the touchscreen keyboard. When the user releases his touch of (e.g., stops touching) the key area associated with the character 'G,' the method and apparatus may stop displaying the plurality of suggestion words. If the user wishes to re-display the plurality of suggestion words, the user may touch a spacebar key area of the touchscreen keyboard associated with space character. In response, the method and apparatus re-display the plurality of suggestion words over a portion of the spacebar key area while the user maintains the touch on the spacebar key area.

In one embodiment, the method and apparatus select a display format for displaying the plurality of suggestion words. The method and apparatus may select the display format from among a plurality of differing display formats that may include at least two of a vertical list format, a horizontal list format, and a radial list format. For example, if a user touches a key area associated with a character located on the center of a top row of characters of the touchscreen keyboard (e.g., 'T'), the method and system may select a horizontal list format such that the plurality of suggested words are displayed horizontally and below the top row of characters of the touchscreen keyboard. Alternatively, the plurality of suggested words are displayed horizontally and above the top row of characters of the touchscreen keyboard. As another example, if a user touches a key area associated with a character located on the right hand side of the touchscreen keyboard (e.g., the character 'P'), then the method and apparatus may select a vertical list format such that the plurality of suggested words are displayed vertically (e.g., one over the other) on the right hand side of the touchscreen keyboard. In a third example, if a user touches a key area associated with a character located in an area near the center of the touchscreen keyboard, the method and apparatus may select a radial list format such that the plurality of suggested words are displayed radially from the touch location. The method and apparatus may then display the suggested words in the selected display format.

In one embodiment, the method and apparatus may adjust the selected display format. The selected display format may be adjusted, for example, by changing a font size of suggestion words, changing the spacing between suggestion words, or changing a number of suggestion words. For example, the method and apparatus may determine a first character and display a plurality of suggested words in a particular display format, such as the vertical list format described above. The method and apparatus may then determine a second character, for example a character in a key area of the touchscreen keyboard below the key area of the first character determined. The method and apparatus may then re-display a different plurality of suggestion words in the vertical list format but with a decreased vertical spacing between the suggested words. For example, the method and apparatus may re-display the plurality of suggestion words beginning on an area of the touchscreen keyboard below the area of where the plurality of suggested words were first displayed.

In one example, the method and apparatus determine a number of suggestion words to include in the plurality of suggestion words based on a display size of the touchscreen keyboard area and the selected display format. The method and apparatus may then display the determined number of suggested words. For example, the method and apparatus may determine to display a larger number of suggested words when the touchscreen keyboard area is larger in size compared to when the touchscreen keyboard area is smaller in size. As another example, the method and apparatus may determine to display a smaller number of suggestion words when the selected display format is a horizontal list format instead of, for example, a vertical list format (e.g., the available display area may be such that more suggestion words may be displayed vertically than horizontally).

In one example, the method and apparatus may select a suggested word out of the plurality of suggestion words by receiving an extension of the first touch input via a swiping gesture on the touchscreen keyboard. In one embodiment, the swiping gesture starts from a current touch location to a displayed location of a selected word. For example, as described above, the method and apparatus may display a plurality of suggestion words over at least a portion of the touchscreen keyboard during a touch input. If the touch input is extended such that a swiping gesture is determined from the current tap-down location to a suggested word in the plurality of suggestion words, the suggested word is selected. The method and apparatus may display the selected word. For example, the selected word may be displayed in a text view area of the presence-sensitive display, where the text view area is separate from the touchscreen keyboard of the presence-sensitive display.

In one embodiment, the method and apparatus determine a user's interaction focus (e.g., eye focus) to be at the text view area during a touch input. For example, the user's interaction focus may be determined to be at a particular location within the text view area (e.g., text view location) during the touch input. In one example, eye tracking software and/or hardware as known in the art, such as an eye tracking camera, may determine a location of eye focus relative to a displayed image. In this example, the location of a user's interaction focus is assumed to be the location of the user's eye focus. If the user's interaction focus is determined to be within the text view area of, for example, a presence-sensitive display, the method and apparatus may display the plurality of suggestion words in the text view area. For example, in continuing with the example from above, the method and apparatus may first display suggestion words starting with the characters 'GO' over a portion of the touchscreen keyboard. If it is determined that the user's interaction focus is in the text view area, the suggestion words may be re-displayed in the text view area. In one embodiment, the suggestion words are re-displayed in the text view area after the user's interaction focus has remained fixed in the text view area for a certain period of time (e.g., an amount of time beyond a threshold period of time).

Turning now to the drawings, FIG. 1 shows diagram 100 illustrating one example of an electronic device 104 that includes a presence-sensitive display 106. The electronic device 104 may be any suitable mobile device, such as a cellular phone, smart phone, tablet, laptop computer, portable media device, or any other suitable mobile device, or may be any suitable non-mobile device, such as a gaming console, computer, in-vehicle display system, or any other suitable non-mobile device. In one example, the electronic device may be a smart phone operating the Android™ operating system (OS). The electronic device 104 may be operated by a user 102. The presence-sensitive display 106 is shown displaying a touchscreen keyboard 110 having a plurality of virtual-key areas for inputting (e.g., entering in) characters. For example, key area 112 allows for the inputting of character 'C' 114. Thus, in one example, a touch by user 102 anywhere on key area 112 inputs the character 'C' 114 to be displayed in text view area 108. Similarly, other key areas allow for the inputting of other characters, as shown in the figure. Presence-sensitive display 106 also includes a text view area 108 for viewing text including inputted (e.g., entered) characters.

Figure 2:
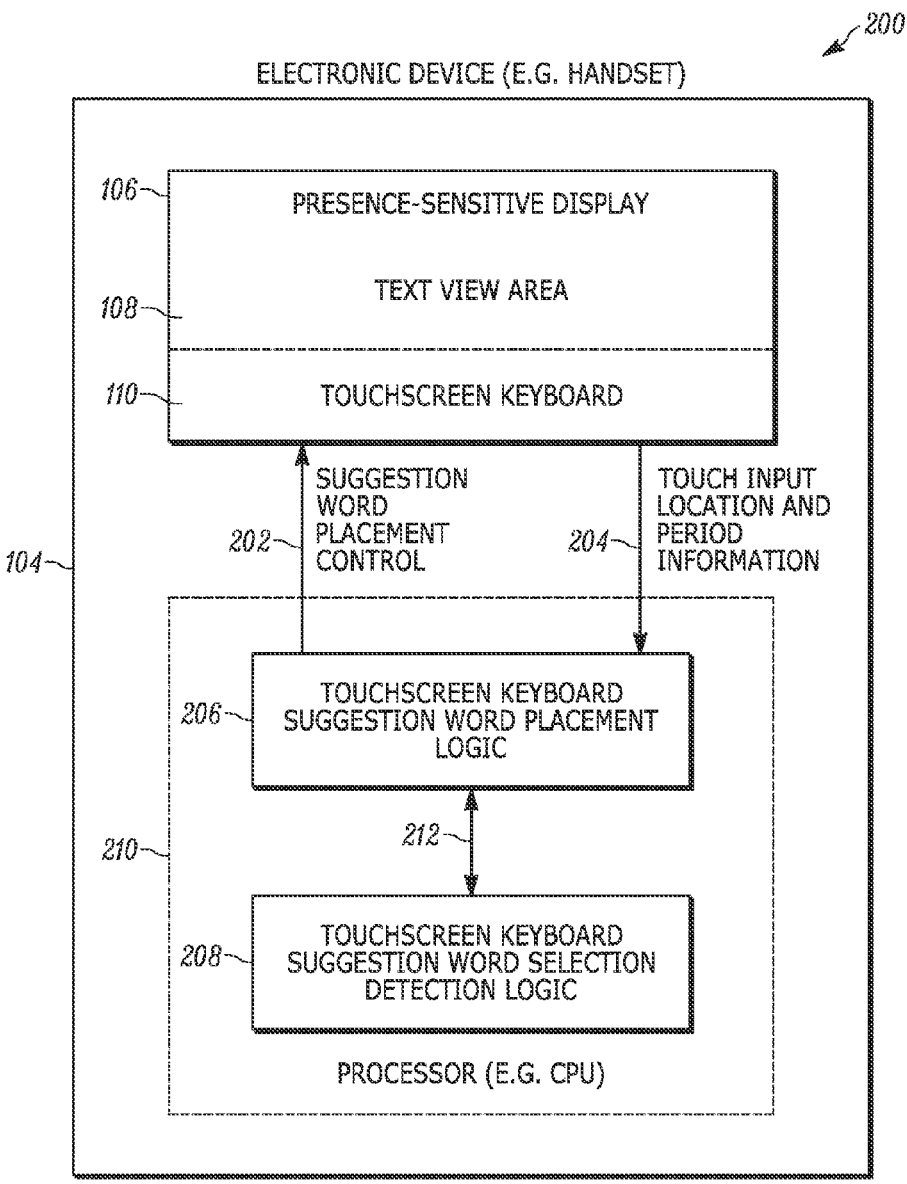
FIG. 2 illustrates a functional block diagram of an example electronic device that includes a presence-sensitive display with touchscreen keyboard and a text view areas, as well as touchscreen keyboard suggestion word placement logic for suggestion word placement and touchscreen keyboard suggestion word selection detection logic for detecting a selection of a suggested word.

FIG. 2 shows functional block diagram 200 providing more details of the electronic device 104 of FIG. 1. As indicated in the figure, electronic device 104 includes touchscreen keyboard suggestion word placement logic 206, touchscreen keyboard suggestion word selection detection logic 208, and presence-sensitive display 106. In some embodiments, some or all of the functions of electronic device 104 may be performed by any suitable processor or processors, or by any other suitable logic, such as discreet logic, Digital Signal Processors (DSPs), Field Programmable Gate Arrays (FPGAs), or Application Specific Integrated Circuits (ASICs). For example, as indicated in the figure, the functions of touchscreen keyboard suggestion word placement logic 206 and touchscreen keyboard suggestion word selection detection logic 208 may be performed by processor 210, which may be any suitable processor, such as a Central Processing Unit (CPU). In some examples, executable suitable instructions may be stored on a computer readable storage medium, where the executable instructions are executable by one or more processors to cause the one or more processors to perform the actions described herein, such as the functions of electronic device 104.

As shown in the figure, touchscreen keyboard suggestion word placement logic 206 is operatively coupled to presence-sensitive display 106 and is operative to obtain touch input location and duration information 204 from presence-sensitive display 106. Touch input location and duration information 204 may be obtained by touchscreen keyboard suggestion word placement logic 206 in any suitable manner. Touch input location and duration information 204 may include, for example, data indicating a location of the touchscreen keyboard 110 that has been touched (e.g., a touch location). For example, such data may include X-Y coordinate data, where the X-Y coordinate data represent X and Y coordinates of a location of a touch on the touchscreen keyboard 110. Touch input location and duration information 204 may also include an indication of a duration of a touch. For example, indication of a current touch (e.g., current tap-down) duration may be obtained as part of the touch input location and duration information 204 via a signal that, when active, indicates a current touch (e.g., current tap-down), and when inactive, indicates no current touch or the end of a current touch. As such, touchscreen keyboard suggestion word placement logic 206 is operable to determine the duration of a current touch. For example, touchscreen keyboard suggestion word placement logic 206 may determine, from a timer, the current time duration of a current touch based on an indication of the touch.

Touchscreen keyboard suggestion word placement logic 206 may be operable to determine a character associated with a key area of touchscreen keyboard 110. For example, based on touch input location and duration information 204, touchscreen keyboard suggestion word placement logic 206 may determine that character 'C' 114 of FIG. 1 is associated with key area 112 of FIG. 1 when a user 102 touches key area 112.

Touchscreen keyboard suggestion word placement logic 206 may provide suggestion word placement control 202 to presence-sensitive display 106 and, as such, control the placement of suggestion words within presence-sensitive display 106. For example, suggestion word placement control 202 may output and control the placement of suggestion words so as to be displayed by presence-sensitive display 106 over at least a portion of the touchscreen keyboard 114. Suggestion word placement control 202 may include, for example, signaling or messaging information to control the placement of suggestion words within the presence-sensitive display 106, or may include any other suitable control logic. In one example, touchscreen keyboard suggestion word placement logic 206 may output suggestion words that include a determined character associated with a virtual-key area of the touchscreen keyboard 110 as described above. In another example, touchscreen keyboard suggestion word placement logic 206 may output suggestion words over at least a portion of a key area of the touchscreen keyboard.

In one example, touchscreen keyboard suggestion word placement logic 206 may receive a first indication of a first touch location associated with a virtual-key area on the touchscreen keyboard and output, for display at the presence-sensitive display 106, the suggestion words over at least a portion of the touchscreen keyboard 114 during the first indication of the first touch location. In another example, touchscreen keyboard suggestion word placement logic 206 may receive a second indication of a second touch location associated with a second key area on the touchscreen keyboard and output, for display at the presence-sensitive display 106, suggestion words over at least a portion of the second key area during the second indication of the second touch location In yet another example, touchscreen keyboard suggestion word placement logic 206 may receive a third indication of a third touch location associated with a spacebar key area on the touchscreen keyboard and output, for display at the presence-sensitive display 106, suggestion words over at least a portion of the spacebar key area during the third indication of the third touch location.

Similarly, suggestion word placement control 202 may output and control the placement of suggestion words so as to be displayed by presence-sensitive display 106 over at least a portion of text view area 108. In one example, suggestion word placement control 202 is operable to receive an indication that the user's interaction focus is on the text view area 108. As such, suggestion word placement control 202 may receive an indication of a touch input, and may output, for display at the presence-sensitive display 106, suggestion words in the text view area during the touch input.

Touchscreen keyboard suggestion word placement logic 206 may also select a display format for displaying suggestion words, and may output the suggestion words in the selected display format. For example, suggestion word placement control 202 may include a control of or an output of suggestion words in a selected display format. The selected display format may be, for example, a horizontal list format, a vertical list format, a radial list format, or any other suitable format. In one embodiment, touchscreen keyboard suggestion word placement logic 206 may be operable to adjust a selected display format and output the suggestion words in an adjusted display format. In one embodiment, touchscreen keyboard suggestion word placement logic 206 may be operable to determine a number of suggestion words to be displayed by the presence-sensitive display 106 based on, for example, received touch input location and duration information 204.

Touchscreen keyboard suggestion word placement logic 206 is also operatively coupled to touchscreen keyboard suggestion word selection detection logic 208. For example, as indicated in the figure, touchscreen keyboard suggestion word placement logic 206 may communicate with touchscreen keyboard suggestion word selection detection logic 208 over communication link 212, which may be any suitable communication link. Touchscreen keyboard suggestion word selection detection logic 208 may be configured to receive an extension of an indication of a touch location via a swiping gesture on the touchscreen keyboard 110 and provide an indication of a selected word to touchscreen keyboard suggestion word placement logic 206 over communication link 212. For example, touchscreen keyboard suggestion word selection detection logic 208 may receive touch input location and duration information 204, which may include current touch location and duration information, over communication link 212, to determine a swiping gesture. The swiping gesture may start from a current touch location corresponding to a key area associated with a character, and proceed to a displayed location of a suggestion word of displayed suggestion words. Touchscreen keyboard suggestion word selection detection logic 208 may then provide an indication of the selected word to touchscreen keyboard suggestion word placement logic 206. Upon receiving this indication, touchscreen keyboard suggestion word placement logic 206 may output the selected word for display in the text view area 108 of the presence-sensitive display 106.

Figure 3:
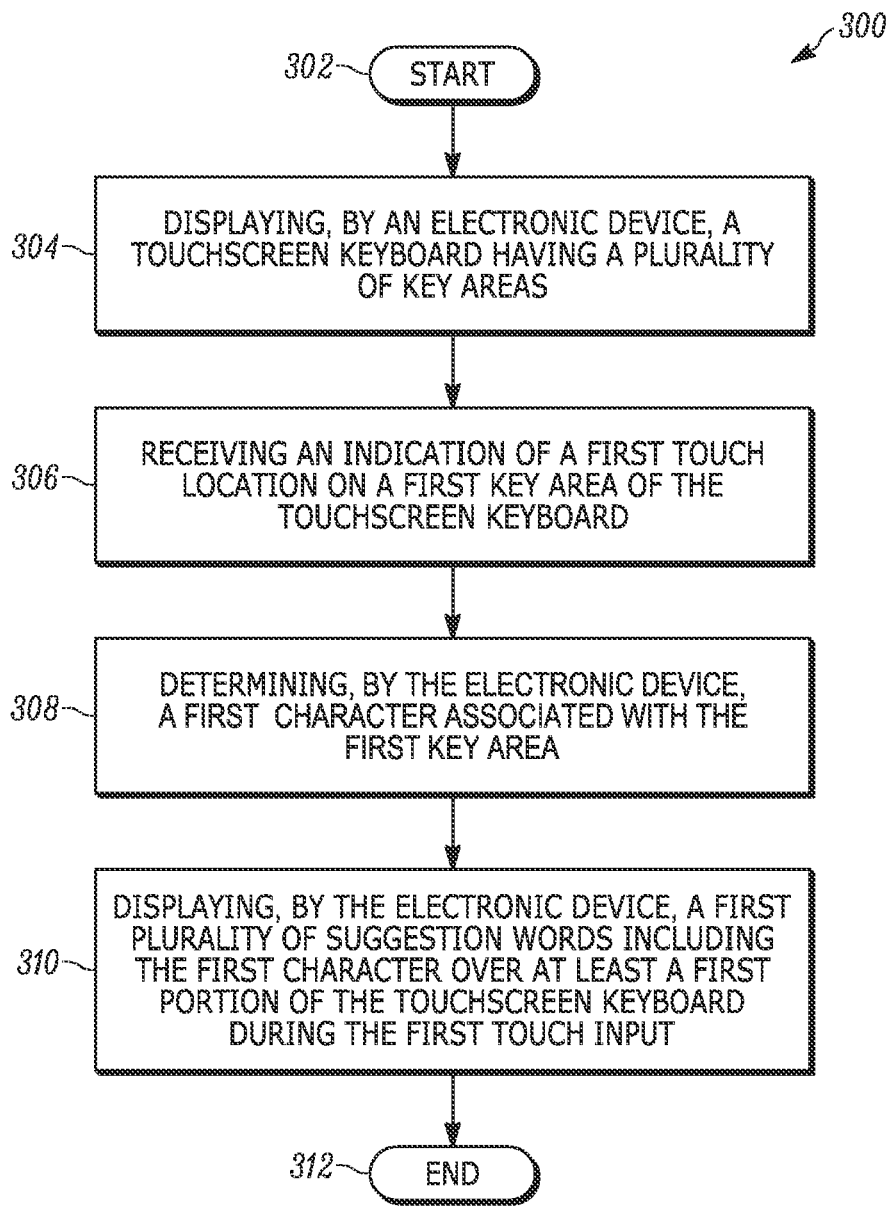
FIG. 3 illustrates a flowchart of an example method for displaying a plurality of suggestion words based on receiving an indication of a touch location on a touchscreen keyboard.

FIG. 3 shows a flowchart of an example method at an electronic device, such as electronic device 104, for displaying a plurality of suggestion words based on receiving an indication of a touch location on a touchscreen keyboard. The method illustrated in FIG. 3, and each of the example methods described herein, may be carried out by one or more suitably programmed controllers or processors executing software. The method may also be embodied in hardware or a combination of hardware and hardware executing software. Suitable hardware may include one or more processors, discreet logic, ASICs, FPGAs, and/or other suitable hardware. Although the methods are described with reference to the illustrated flowcharts (e.g., in FIG. 3), it will be appreciated that many other ways of performing the acts associated with the method(s) may be used. For example, the order of some operations may be changed, and some of the operations described may be optional. Additionally, while the methods may be described with reference to the example electronic device 104, it will be appreciated that the methods may be implemented by other apparatus as well, and that the electronic device 104 may implement other methods.

Method 300 includes displaying (304), by an electronic device, a touchscreen keyboard having a plurality of key areas. The method further includes receiving (306) an indication of a first touch location on a first key area of the touchscreen keyboard. The method also includes determining (308), by the electronic device, a first character associated with the first key area, and displaying (310), by the electronic device, a first plurality of suggestion words, that include the first character, over at least a first portion of the touchscreen keyboard during the first touch input.

Figure 4:
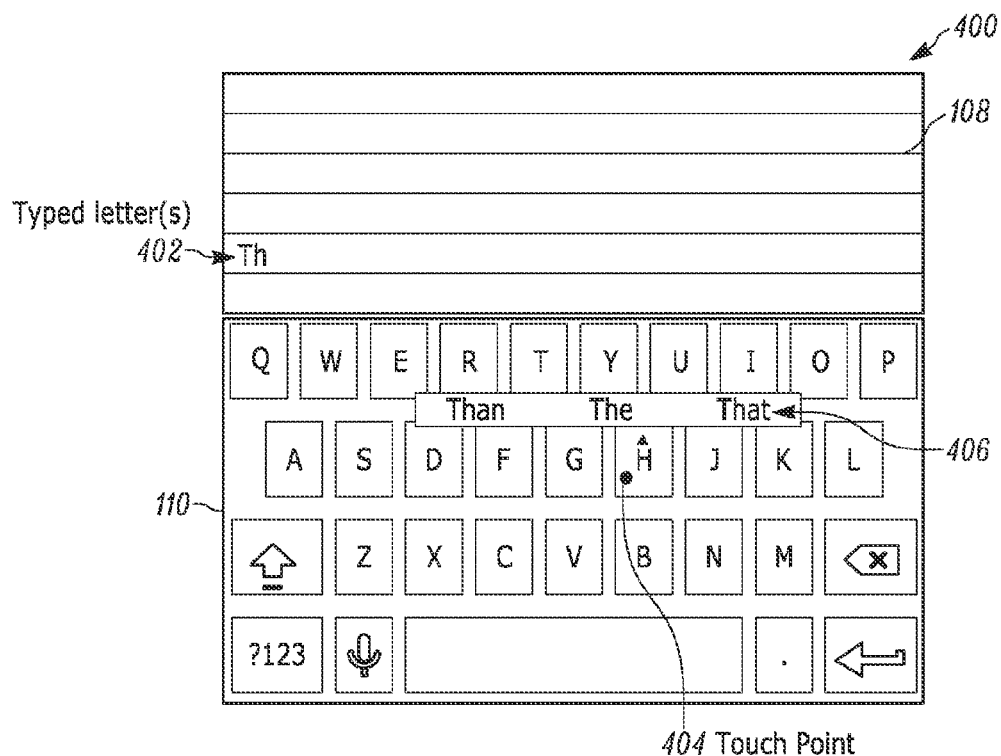
FIG. 4 illustrates a diagram of one example of displaying suggestion words over a portion of a touchscreen keyboard of a presence-sensitive display.

FIG. 4, as well as FIGS. 5-8, present diagrams illustrating examples of displaying suggestion words over at least a portion of a touchscreen keyboard 110 that may be displayed on a presence-sensitive display. The diagrams also illustrate a text view area 108 that may also be displayed on the presence-sensitive display. For example, in FIG. 4, diagram 400 shows a user, such as user 102, to input typed letters 402, touches (e.g., taps down) the key area associated with the character 'T,' releases the touch, and then touches touch point 404, which is the key area associated with character 'H.' As the user maintains touching (e.g., dwells on) touch point 404, suggestion words appear within suggestion word bar 406, which is displayed above the current touch point 404 in a horizontal list format. In this example, a suggestion word bar 406 appears over a portion of the key area associated with character 'H,' but not over the character 'H' itself. In other examples, the suggestion word bar 406 may appear over the character associated with the touch point 404, but not over characters associated with key areas above or below the key area associated with the touch point 404. In yet other examples, the suggestion word bar 406 may appear over a portion of the key areas associated with characters, but not over any characters (e.g., the suggestion word bar 406 may appear between rows of key areas associated with characters, but not over the characters themselves). In addition, although the suggestion words appear within suggestion word bar 406, the suggestion words may instead be displayed as a list, but not within a suggestion word bar. The suggestion words or the suggestion word bar 406 may appear, for example, as a floating preview of suggested words over a portion of touchscreen keyboard 110. For example, the suggestion words or the suggestion word bar 406, while not part of the touchscreen keyboard 110, appear displayed over at least a portion of the touchscreen keyboard 110.

Figure 5:
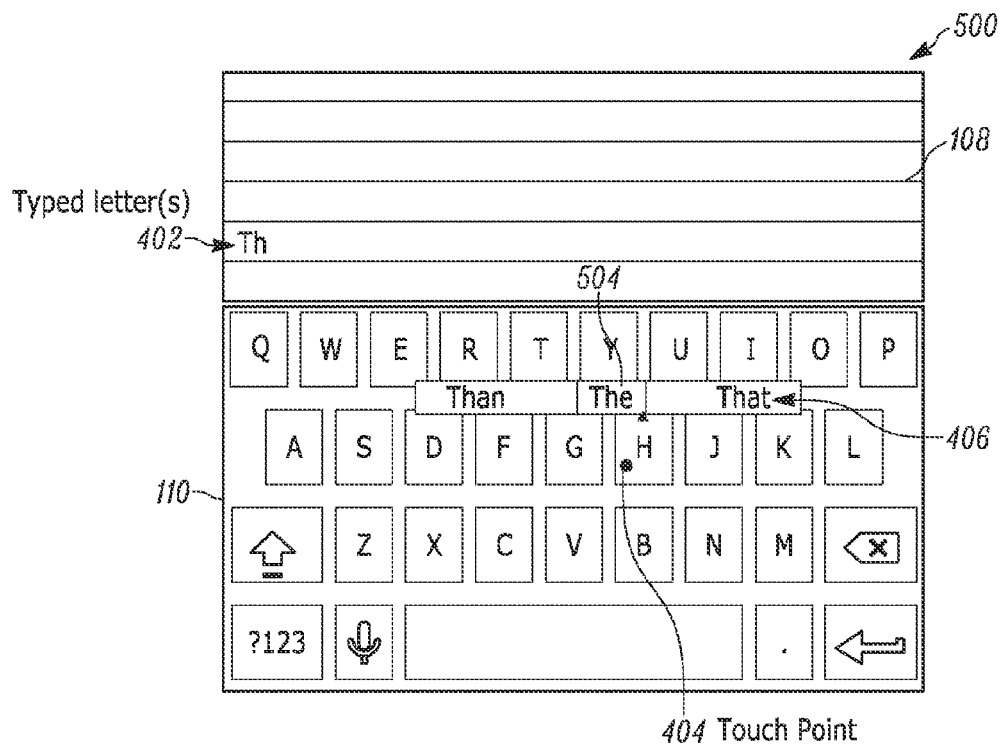
FIG. 5 illustrates a diagram of another example of displaying suggestion words over a portion of a touchscreen keyboard of a presence-sensitive display, and also illustrates the selection of a suggested word.

Continuing the example of FIG. 4, as illustrated in diagram 500 of FIG. 5, a user may select a selected suggestion word 504. For example, a user, by performing a swiping gesture starting from touch point 404 to the displayed location of selected suggestion word 504 of displayed suggestion word bar 406, selects selected suggestion word 504 to be displayed in text view area 108. In this example, the user selects the word "The" as indicated in the figure. To select one of the other words, the user may perform a swiping gesture starting from touch point 404 to the displayed location of that other word.

Figure 6:
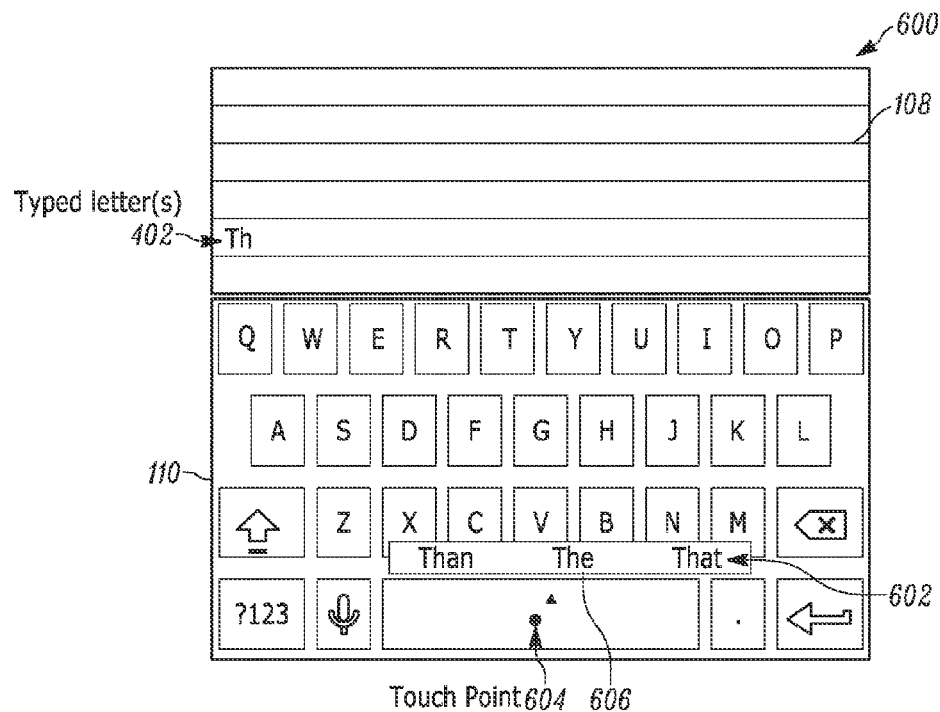
FIG. 6 illustrates an example diagram of displaying suggestion words over a spacebar key area of a touchscreen keyboard of a presence-sensitive display, and also illustrates the selection of a suggested word.

FIG. 6 illustrates an example 600 of displaying suggestion words over a spacebar key area of a touchscreen keyboard of a presence-sensitive display, and also illustrates the selection of a suggested word. As illustrated in the diagram, touch point 604 is associated with a key area corresponding to a spacebar. As a user dwells on touch point 604, the suggestion word bar 406 appears over a portion of the key area associated with the spacebar. For example, if a user forgets to dwell on a key area of the previous touch location to bring up suggestion words, such as suggestion word bar 406, the user may dwell on a key area associated with the spacebar to bring up the previous suggestion words, such as is indicated by suggestion word bar 602. In this example, the suggestion words within suggestion word bar 602 are displayed in a horizontal list format. A user, by performing a swiping gesture starting from touch point 604 to the displayed location of a selected suggestion word 606 of displayed suggestion word bar 602, may select selected suggestion word 606 to be displayed in text view area 108.

Figure 7:
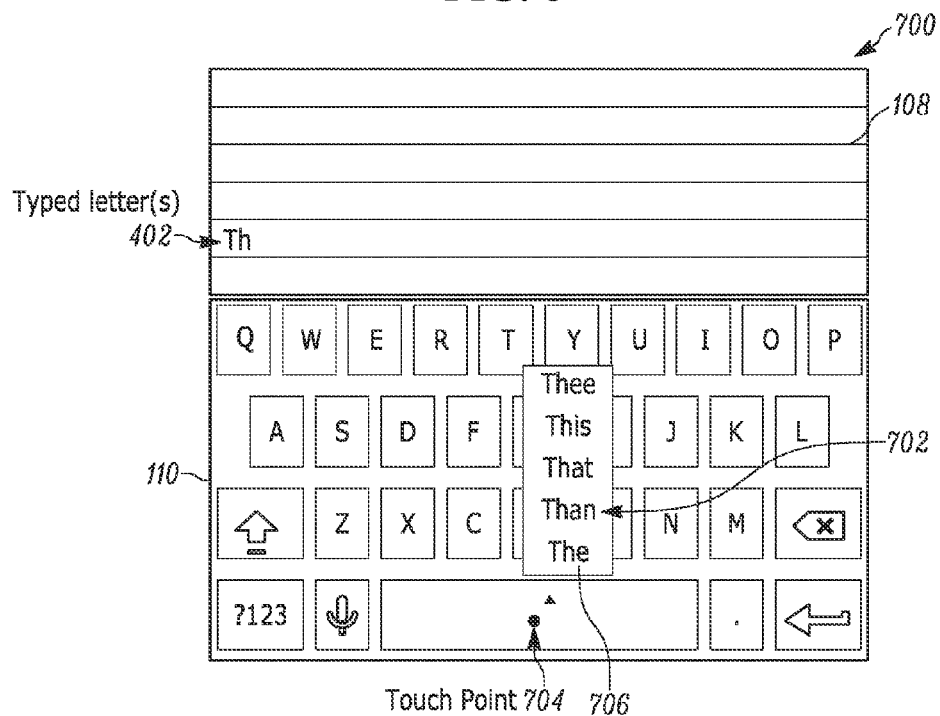
FIG. 7 is illustrates another example diagram of displaying suggestion words over a portion of a touchscreen keyboard of a presence-sensitive display, and also illustrates the selection of a suggested word.

FIG. 7 illustrates an example 700 similar to the example illustrated in FIG. 6, except that the suggestion words are displayed in a vertical list format within suggestion bar 702. A user, by performing a swiping gesture starting from touch point 704 to the displayed location of a selected suggestion word 706 of displayed suggestion word bar 702, may select selected suggestion word 706 to be displayed in text view area 108. Similarly, if the user wanted to select a word appearing above selected suggestion word 706, the user would perform the swiping gesture from touch point 704 to the displayed location of that other word.

Figure 8:
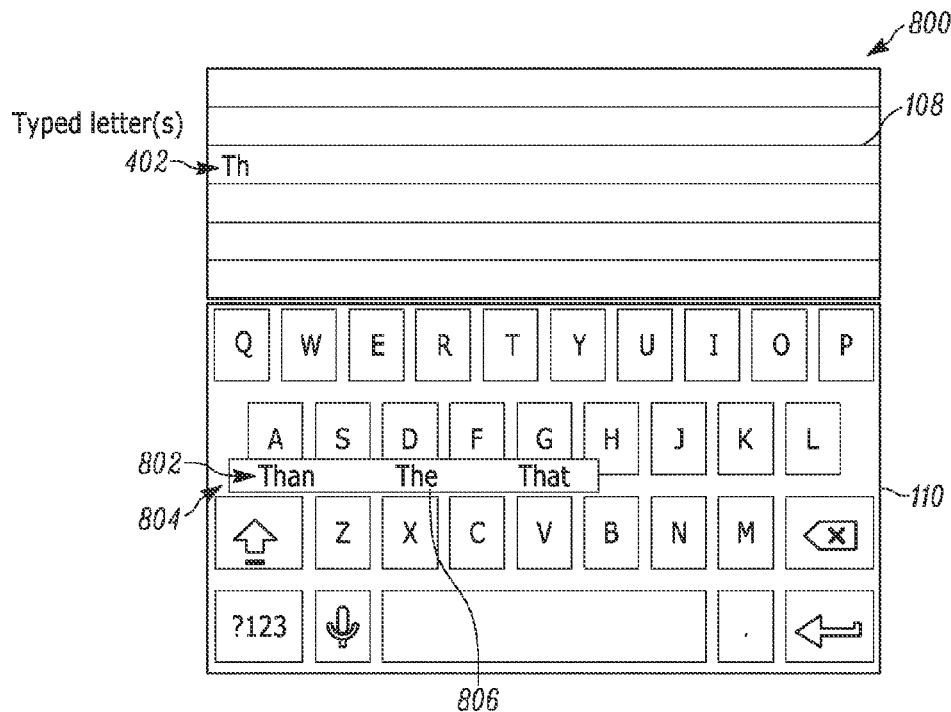
FIG. 8 illustrates a diagram of one example of displaying suggestion words over a portion of a touchscreen keyboard of a presence-sensitive display based on detecting the location of a user's interaction focus.

FIG. 8 shows diagram 800 illustrating one example of displaying suggestion words over a portion of a touchscreen keyboard 110 of a presence-sensitive display based on detecting the location of a user's interaction focus 804. For example, as indicated in the figure, suggestion word bar 802 is displayed near the location of a user's interaction focus 804, as detected by, for example, an eye-tracking sensor as known in the art. In one example, suggestion word bar 802 is not displayed until the user's interaction focus remains fixed for a threshold period of time. As indicated in the figure, in this example the suggestion word bar 802 is displayed between rows of key areas without displaying over any character associated with those key areas. In this example, a user, by touching (e.g., tapping down) on a suggested word appearing within suggestion word bar 802, may select a suggested word, as is indicated by selected suggestion word 806.

Figure 9:
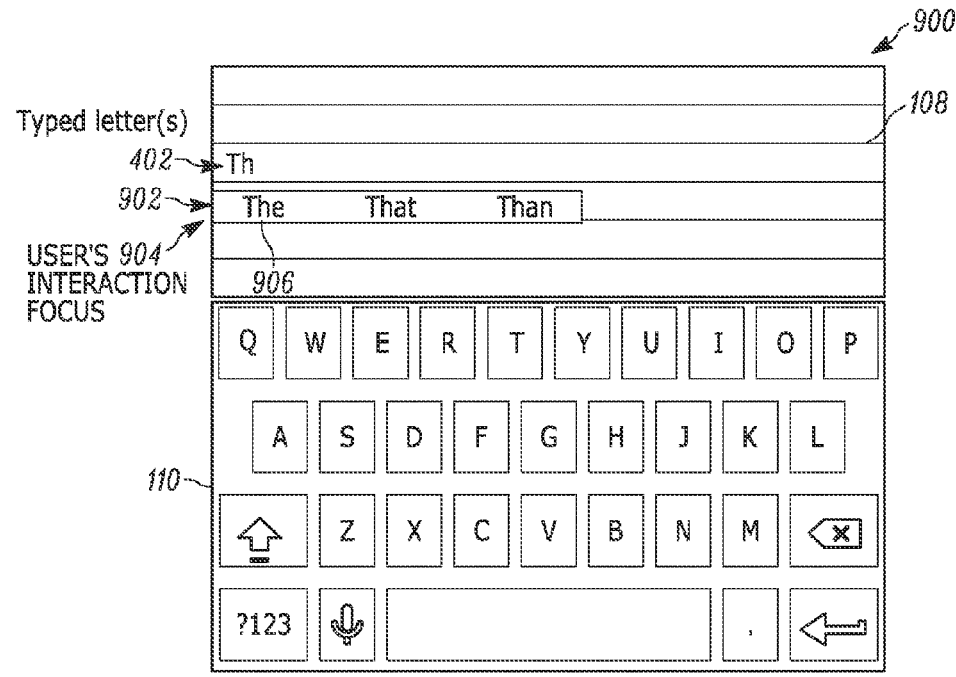
FIG. 9 illustrates a diagram of another example of displaying suggestion words on a presence-sensitive display displaying a touchscreen keyboard having a plurality of key areas for inputting characters and a text view area for viewing inputted characters based on detecting the location of a user's interaction focus, and selecting a suggested word.

FIG. 9 shows diagram 900 illustrating one example of displaying suggestion words in the text view area 108 of a presence-sensitive display based on detecting the location of a user's interaction focus 904. In this example, the suggestion word bar 902 is displayed just below the typed letters 402 with the suggested words appearing in a horizontal list format. In another example, the suggestion word bar 902 is displayed just above the typed letters 402 with the suggested words appearing in a horizontal list format. In yet another example, the suggestion word bar 902 is displayed to the right or left of typed letters 402, with the suggested words appearing in a vertical list format. As in the example illustrated in FIG. 8, a user, by touching on a suggested word appearing within suggestion word bar 802, may select a suggested word, as is indicated by selected suggestion word 906.

Figure 10:
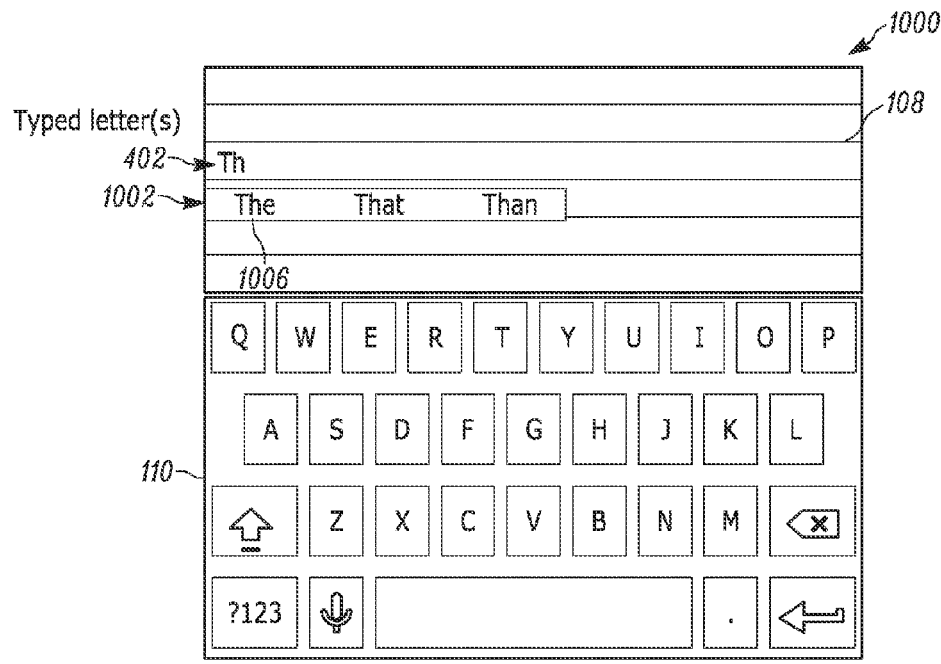
FIG. 10 illustrates a diagram of one example of displaying suggestion words over a portion of a text view area of a presence-sensitive display, and also illustrates the selection of a suggested word.

FIG. 10 shows diagram 1000 illustrating one example of displaying suggestion words over a portion of a text view area 108 of a presence-sensitive display, and also illustrates the selection of a suggested word. As described above, a user may dwell on a key area of the touchscreen keyboard 110 to display suggestion words, such as suggestion words appearing within suggestion word bar 1002. However, in this embodiment, the suggested words or, as indicated in the diagram, the suggestion word bar 1002, is displayed in the text view area 108 of a presence-sensitive display. In this example, the suggested words appear within the suggestion word bar 1002 in a horizontal list format, just below typed letters 402. In another example, the suggested words or the suggestion word bar 1002 may appear just above typed letters 402 in a horizontal format, or may appear to the right or left of typed letters 402 in a horizontal format. A user, by touching on a suggested word appearing within suggestion word bar 1002, may select a suggested word, as is indicated by selected suggestion word 1006.

Figure 11:
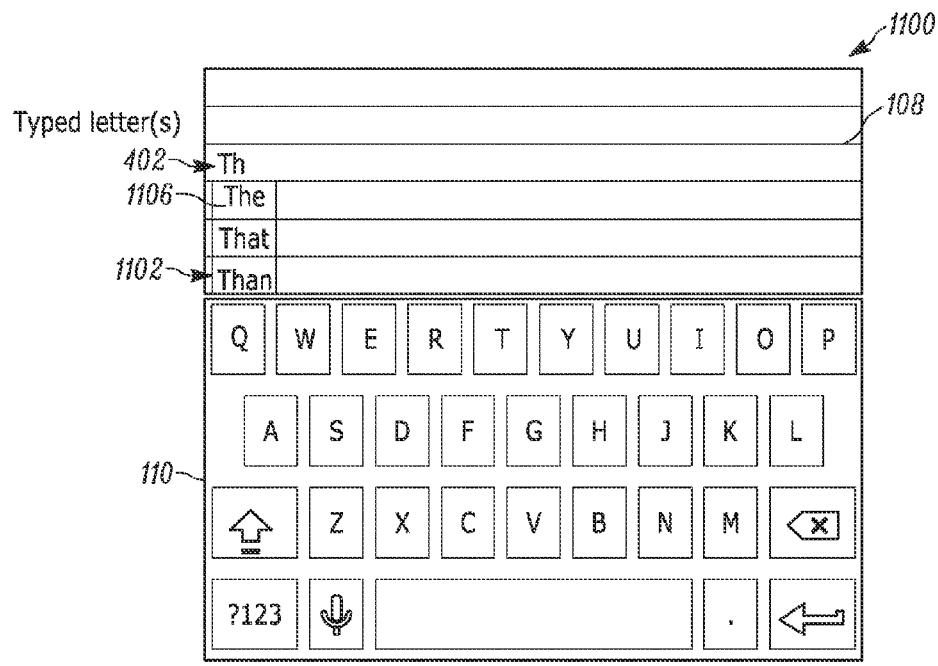
FIG. 11 illustrates a diagram of another example of displaying suggestion words over a portion a text view area of a presence-sensitive display, and also illustrates the selection of a suggested word.

FIG. 11 illustrates another example of displaying suggestion words over a portion a text view area 108 of a presence-sensitive display, and also illustrates the selection of a suggested word. FIG. 11 is similar to the example illustrated in FIG. 10, except that the suggestion words are displayed in a vertical list format within suggestion bar 1102 just below typed letters 402. In other examples, the suggestion words may be displayed in a vertical list format within suggestion bar 1102 just above, to the right of, or to the left of, typed letters 402. A user, by touching on a suggested word appearing within suggestion word bar 1102, may select a suggested word, as is indicated by selected suggestion word 1106.

Figure 12:
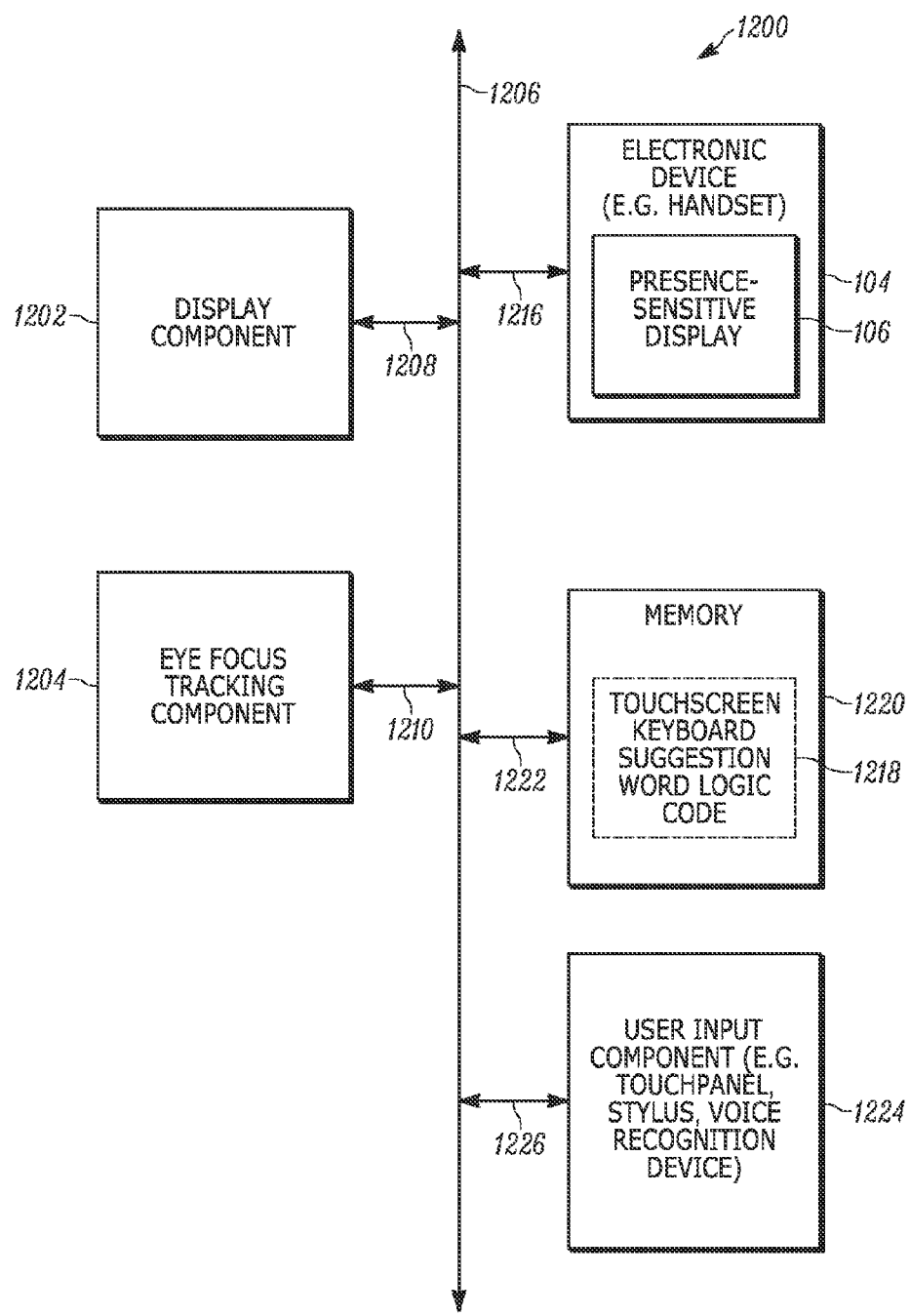
FIG. 12 illustrates a diagram of an example system including an electronic device with a presence-sensitive display, an eye focus tracking component, a display component, a user input component, and touchscreen keyboard suggestion word logic code residing in memory.

FIG. 12 illustrates a diagram of an example system including an electronic device 104 with a presence-sensitive display 106, an eye focus tracking component 1204, a display component 1202, a user input component 1224, and touchscreen keyboard suggestion word logic code 1218 residing in memory 1220, all operatively connected to expansion bus 1206. For example, electronic device 104 may communicate with expansion bus 1206 over communication link 1216; display component 1202 may communicate with expansion bus 1206 over communication link 1208; eye focus tracking component 1204 may communicate with expansion bus 1206 over communication link 1210; memory 1220 may allow for communications with expansion bus 1206 over communication link 1222; and user input component 1224 may communicate with expansion bus 1206 over communication link 1226. Expansion bus 1206 may be, for example, any number of interconnects allowing communications among the various devices, or any other suitable bus. In one example, expansion bus 1206 may be a wireless network allowing communications between wireless devices. Memory 1220, illustrated as storing touchscreen keyboard suggestion word logic code 1218, may be any suitable computer readable storage medium. Examples of computer readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Touchscreen keyboard suggestion word logic code 1218 may include executable instructions that when executed by one or more processors perform one or more functions of electronic device 104. For example, touchscreen keyboard suggestion word logic code 1218 may include logic code for one or more of the functions of touchscreen keyboard suggestion word placement logic 206 and touchscreen keyboard suggestion word selection detection logic 208. In one example, electronic device 104 is operable to read touchscreen keyboard suggestion word logic code 1218 from memory 1220 and execute touchscreen keyboard suggestion word logic code 1218 to perform one or more of its functions.

Electronic device 104 may be operable to communicate with eye focus tracking component 1214 to obtain user interaction focus information as described above. For example, eye focus tracking component 1214 may provide to electronic device 104 information (e.g., data) indicating a location of a user's interaction focus. The location of the user's interaction focus may be relative to a presence-sensitive display. In one embodiment, the location of a user's interaction focus provided by eye focus tracking component 124 is relative to a location in display component 1202, whereby electronic device 104 is operable to provide the image to be displayed on presence-sensitive display 106 to display component 1202 for display. As such, the user's interaction focus provided by eye focus tracking component 1204 is based on a user's interaction focus on display component 1202. In one example, display component 1202 is a presence sensitive display, that may perform the functions of a presence-sensitive display, such as presence-sensitive display 106, as described in this disclosure.

System 1200 may also include user input component 1224, allowing a user to input characters via a touchscreen keyboard. For example, rather than using one's finger to input a character by touching a key area associated with that character of a presence-sensitive display, the user may utilize user input component 1224 to input a character. The user input component 1224 may be, for example, a stylus, a touch panel, or any other suitable input component.

By displaying suggestion words in accordance with this disclosure, several advantages are contemplated. For example, in some embodiments, by displaying multiple suggestion words over at least a portion of a touchscreen keyboard, presence-sensitive display area that otherwise would have been used to display the suggestion words may now be used for other purposes, such as allowing for a larger text view area of the presence-sensitive display. Moreover, in some embodiments, by displaying suggestion words near a current tap-down location, a user may view and select a suggested word with minimal adjustment to the user's interaction focus. Likewise, when the user's interaction focus is in the text view area, some embodiments provide for the display of suggestion words in the text view area near the location of the user's interaction focus, thus minimizing adjustment of the user's interaction focus. In addition, multiple suggestion words may be displayed in response to tap typing, rather than gesture typing. Other advantages will be recognized by those of ordinary skill in the art.

The foregoing description has been presented for the purposes of illustration and description. It is not intended to be exhaustive or to limit the invention to the exemplary embodiments disclosed. Many modifications and variations are possible in light of the above teachings. Although features and elements are described above in particular combinations, each feature or element can be used alone without the other features and elements or in various combinations with or without other features and elements. It is intended that the scope of the invention be limited not by this detailed description of examples, but rather by the claims appended hereto. The above detailed description of the embodiments and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A method comprising:
    displaying, by an electronic device, a touchscreen keyboard having a plurality of key areas, wherein each key area from the plurality of key areas corresponds to a different respective character;
    determining, by the electronic device, based on a first touch location of a first touch input on a first key area from the plurality of key areas, a first character;
    automatically selecting, by the electronic device, based on where the first key area is displayed within the touchscreen keyboard, a particular display format from a plurality of differing display formats for displaying a first plurality of suggestion words including the first character, wherein the plurality of differing display formats include a vertical list format, a horizontal list format, and a radial list format, wherein:
        the particular display format is automatically selected to be a vertical list format when the first key area is displayed on a left or right side of the virtual keyboard,
        the particular display format is automatically selected to be a horizontal list format when the first key area is not displayed on the left or right side of the virtual keyboard and the first key area is displayed in a top or bottom row of key areas of the virtual keyboard; and
        the particular display format is automatically selected to be a radial list format when the first key area is not displayed on the left or right side of the virtual keyboard and the first key area is displayed in a middle row of key areas of the virtual keyboard, the middle row being between the top and bottom rows; and
    while detecting the first touch input, displaying, by the electronic device, the first plurality of suggestion words, in the particular display format and over at least a portion of the first key area of the touchscreen keyboard.

2. The method of claim 1, further comprising:
    determining, by the electronic device, based on a second touch location of a second touch input on the touchscreen keyboard, a second character; and
    while detecting the second touch input, displaying, by the electronic device, over at least a second portion of the touchscreen keyboard, a second plurality of suggestion words including the first character and the second character.

3. The method of claim 1, further comprising:
    determining, by the electronic device, based on a second touch location of a second touch input on a second key area of the touchscreen keyboard, a second character;
    automatically adjusting the particular display format by at least one of:
        changing a font size of a second plurality of suggestion words;
        changing a spacing between the second plurality of suggestion words; and
        changing a number of suggested words included in the plurality of suggestion words; and
    after adjusting the particular display format, and while detecting the second touch input, displaying, by the electronic device, in the display format, over at least a second portion of the second key area of the touchscreen keyboard, a second plurality of suggestion words including the first character and the second character.

4. The method of claim 1, wherein displaying the first plurality of suggestion words including the first character comprises:
    determining a number of suggested words to include in the first plurality of suggestion words based on a size of the touchscreen keyboard and the particular display format; and
    displaying the first plurality of suggestion words having the determined number of suggested words.

5. The method of claim 1, further comprising:
    receiving an extension of the first touch input via a swiping gesture on the touchscreen keyboard starting from the first touch location to a displayed location of a selected word of the first plurality of suggestion words; and
    displaying the selected word in a text view area separate from the touchscreen keyboard.

6. The method of claim 1, wherein displaying the first plurality of suggestion words including the first character comprises:
    determining a current time duration of the first touch input; and
    displaying the first plurality of suggestion words when the current time duration of the first touch input is beyond a first threshold time duration.

7. The method of claim 1, further comprising:
    determining, by the electronic device, a user interaction focus at a text view area while detecting the first touch input; and
    displaying the first plurality of suggestion words in the text view area.

8. The method of claim 1, further comprising:
    receiving, by the electronic device, at a second touch location associated with a spacebar key area on the touchscreen keyboard, a second touch input; and
    displaying, by the electronic device, over at least a portion of the spacebar key area while detecting the second touch input, the first plurality of suggestion words.

9. An electronic device comprising:
    a presence-sensitive display for displaying a touchscreen keyboard having a plurality of key areas and receiving touch inputs at touch locations, wherein each key area from the plurality of key areas corresponds to a different respective character; and
    at least one processor, coupled to the presence-sensitive display, and configured to:
        receive a first indication of a first touch location on a first key area from the plurality of key areas;
        determine a first character associated with the first key area;
        automatically select, based on where the first key area is displayed within the touchscreen keyboard, a particular display format from a plurality of differing display formats for displaying a first plurality of suggestion words including the first character, wherein the plurality of differing display formats include a vertical list format, a horizontal list format, and a radial list format, wherein:
- the particular display format is automatically selected to be a vertical list format when the first key area is displayed on a left or right side of the virtual keyboard,
- the particular display format is automatically selected to be a horizontal list format when the first key area is not displayed on the left or right side of the virtual keyboard and the first key area is displayed in a top or bottom row of key areas of the virtual keyboard; and
- the particular display format is automatically selected to be a radial list format when the first key area is not displayed on the left or right side of the virtual keyboard and the first key area is displayed in a middle row of key areas of the virtual keyboard, the middle row being between the top and bottom rows; and output, for display at the presence-sensitive display while detecting the first touch input, in the particular display format and over at least a first portion of the first key area of the touchscreen keyboard, the first plurality of suggestion words.

10. The electronic device of claim 9, wherein the at least one processor is configured to:
- receive a second indication of a second touch location on a second key area from the plurality of key areas;
- determine a second character associated with the second key area;
- adjust the particular display format by at least one of:
  - changing a font size of a second plurality of suggestion words;
  - changing a spacing between the second plurality of suggestion words; and
  - changing a number of suggested words included in the second plurality of suggestion words; and
- after adjusting the particular display format, and while detecting the second touch input, output, for display at the presence-sensitive display, in the particular display format and over at least a second portion of the second key area, the second plurality of suggestion words including the first character and the second character.

11. The electronic device of claim 9, wherein the at least one processor is configured to:
- determine a number of suggested words to include in the first plurality of suggestion words based on a size of the touchscreen keyboard and the selected display format; and
- output the first plurality of suggestion words including the first character, for display at the presence-sensitive display, having the determined number of suggested words.

12. The electronic device of claim 9, wherein the at least one processor is configured to:
- receive an extension of the first indication of the first touch location via a swiping gesture on the touchscreen keyboard starting from the first touch location to a displayed location of a selected word of the first plurality of suggestion words; and
- output, for display at the presence-sensitive display, in a text view area separate from the touchscreen keyboard, the selected word.

13. The electronic device of claim 9, wherein the at least one processor is further configured to:
- determine a current time duration of the first indication of the first touch location; and
- output, for display at the presence-sensitive display, when the current time duration of the first touch input is beyond a first threshold time duration, the first plurality of suggestion words including the first character.

14. The electronic device of claim 9, wherein the at least one processor is further configured to:
- receive an indication that a user interaction focus is on a text view area; and
- output, for display at the presence-sensitive display, the first plurality of suggestion words including the first character in the text view area while detecting the first touch input.

15. The electronic device of claim 9, wherein the at least one processor is configured to:
- receive a second indication of a second touch location associated with a spacebar key area on the touchscreen keyboard; and
- output, for display at the presence-sensitive display, the first plurality of suggestion words including the first character over at least a portion of the spacebar key area while detecting the second indication of the second touch location.

16. A non-transitory computer readable medium comprising executable instructions that when executed by one or more processors cause the one or more processors to:
- receive a first indication of a first touch location on a first key area of the touchscreen keyboard, wherein each key area from the plurality of key areas corresponds to a different respective character;
- determine a first character associated with the first key area;
- automatically select, based on where the first key area is displayed within the touchscreen keyboard, a particular display format from a plurality of differing display formats for displaying a first plurality of suggestion words including the first character, wherein the plurality of differing display formats include a vertical list format, a horizontal list format, and a radial list format, wherein:
  - the particular display format is automatically selected to be a vertical list format when the first key area is displayed on a left or right side of the virtual keyboard, the particular display format is automatically selected to be a horizontal list format when the first key area is not displayed on the left or right side of the virtual keyboard and the first key area is displayed in a top or bottom row of key areas of the virtual keyboard; and
  - the particular display format is automatically selected to be a radial list format when the first key area is not displayed on the left or right side of the virtual keyboard and the first key area is displayed in a middle row of key areas of the virtual keyboard, the middle row being between the top and bottom rows; and
- while detecting the first touch input, output, for display in the particular display format, over at least a first portion of the first key area, the first plurality of suggestion words.

17. The non-transitory computer readable medium of claim 16, wherein the executable instructions, when executed by the one or more processors, cause the one or more processors to:
- receive a second indication of a second touch location on a second key area of the touchscreen keyboard;

determine a second character associated with the second key area; and while detecting the second touch input: output, for display, over at least a portion of the second key area, a second plurality of suggestion words including the first character and the second character.

\* \* \* \* \*